United States Patent [19]

Pasdera et al.

[11] Patent Number: 4,792,953
[45] Date of Patent: Dec. 20, 1988

[54] DIGITAL SIGNAL ERROR CONCEALMENT

[75] Inventors: Leonard A. Pasdera, San Carlos; Maurice G. Lemoine, Redwood City, both of Calif.

[73] Assignee: Ampex Corporation, Redwood City, Calif.

[21] Appl. No.: 31,503

[22] Filed: Mar. 27, 1987

Related U.S. Application Data

[63] Continuation-in-part of Ser. No. 845,648, Mar. 28, 1986, abandoned.

[51] Int. Cl.⁴ ............................................. G06F 11/10
[52] U.S. Cl. .................................... 371/31; 358/314; 358/336
[58] Field of Search ....................... 371/31, 38, 39, 40; 360/38.1; 358/314, 327, 336

[56] References Cited

U.S. PATENT DOCUMENTS

| | | | |
|---|---|---|---|
| 4,146,099 | 3/1979 | Matsushima et al. | 371/31 X |
| 4,451,920 | 5/1984 | Hoshimi et al. | 371/40 |
| 4,497,055 | 1/1985 | Hoshino et al. | 371/31 |
| 4,546,474 | 10/1985 | Sako et al. | 371/39 |
| 4,577,237 | 3/1986 | Collins | 358/336 |
| 4,639,920 | 1/1987 | Kaneko | 371/31 |
| 4,641,309 | 2/1987 | Nakano et al. | 371/31 |
| 4,675,867 | 6/1987 | Masui et al. | 371/31 |

Primary Examiner—Charles E. Atkinson
Attorney, Agent, or Firm—Robert K. Schumacher; Ralph L. Mossino; Richard P. Lange

[57] ABSTRACT

Errors in data words recovered following the transmission of digital data having internal correlation are concealed by substituting recovered correlated words for recovered words suspected of being in error. Concealment may follow the correction of errors according to an error correcting code. Error flag signals are used to identify corresponding respective recovered words that are suspected of being in error. These error flag signals are counted over a predetermined totaling interval, and a concealment interval signal is generated for a concealment interval when the count exceeds a predetermined threshold count. Recovered correlated words are substituted for recovered words corresponding to respective error flags and for all other recovered words corresponding to a respective concealment interval. In accordance with one aspect of the invention, the concealment interval is centered upon the corresponding totaling interval. According to another aspect of the invention, the concealment interval signal is generated upon the occurrence of an error flag signal while the count exceeds the predetermined count. Also, the concealment interval signal is preferably restarted upon the occurrence of a subsequent error flag signal while the count exceeds the predetermined count.

20 Claims, 4 Drawing Sheets

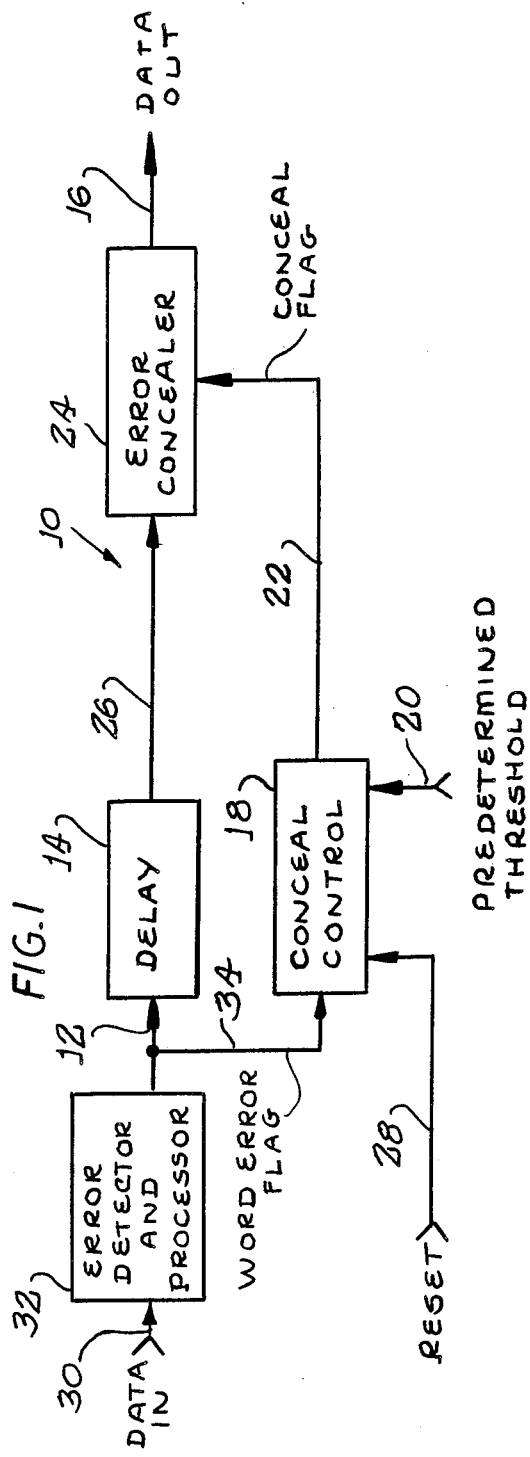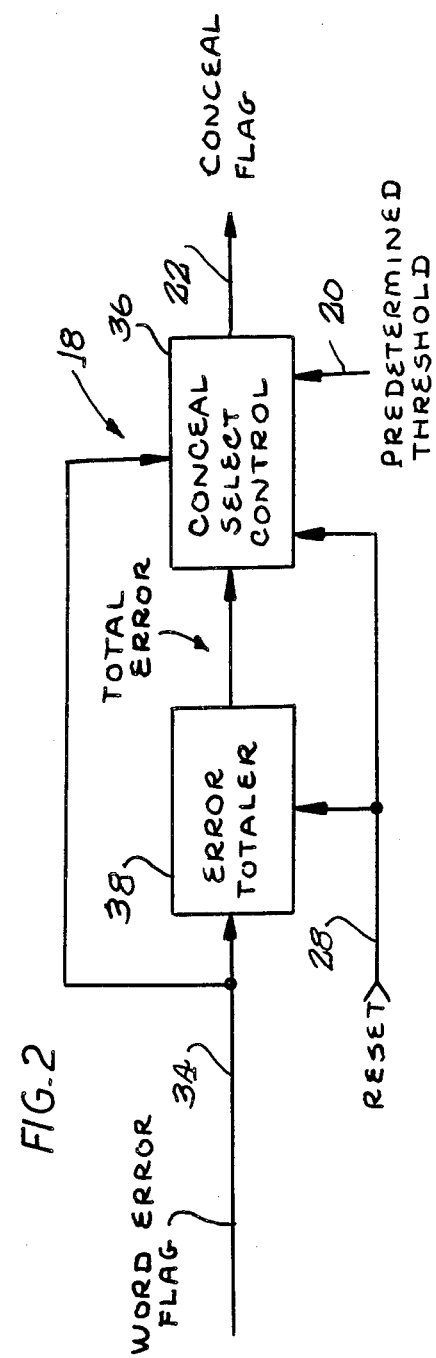

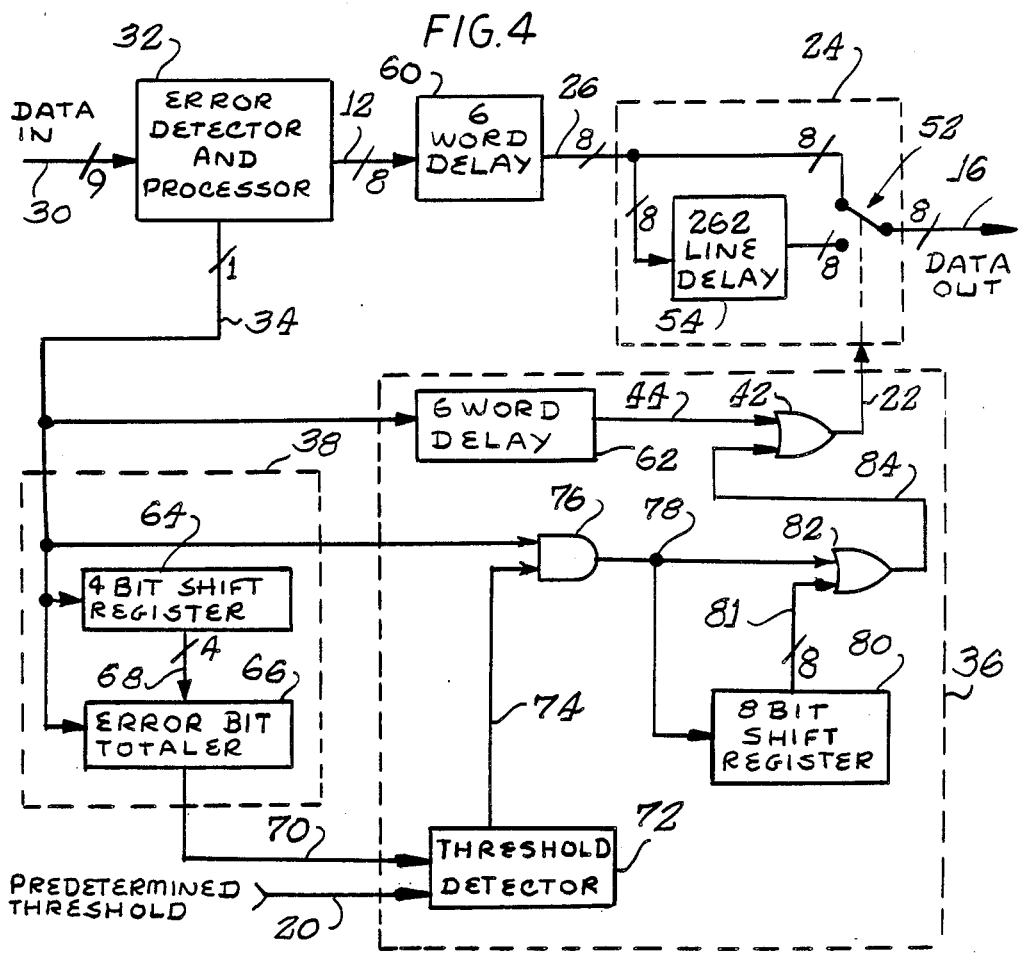
FIG. 4
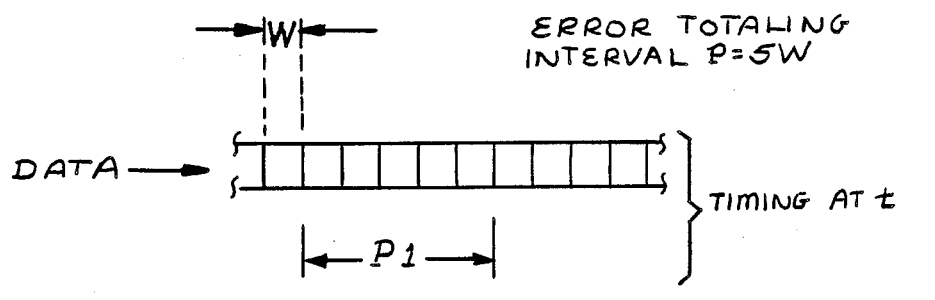
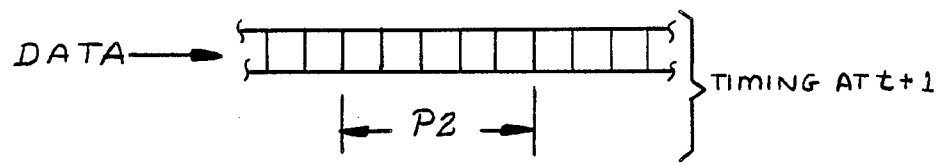
FIG. 5

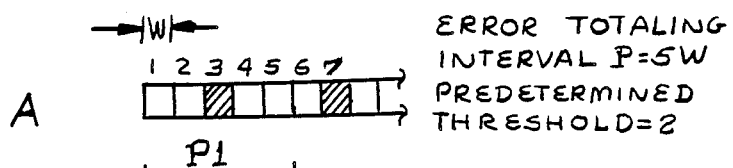
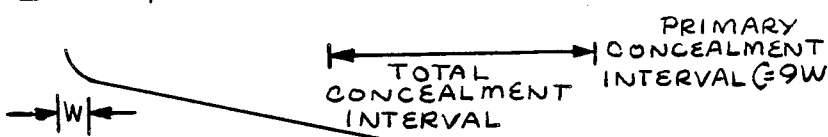
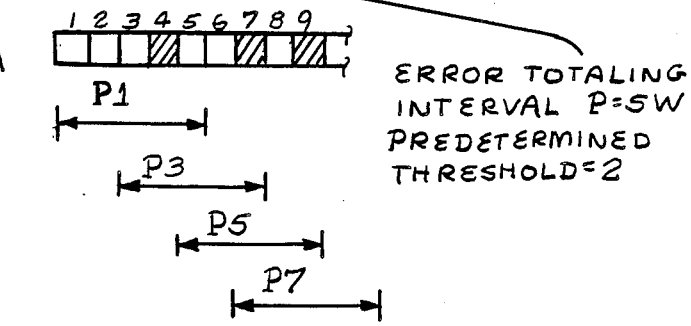
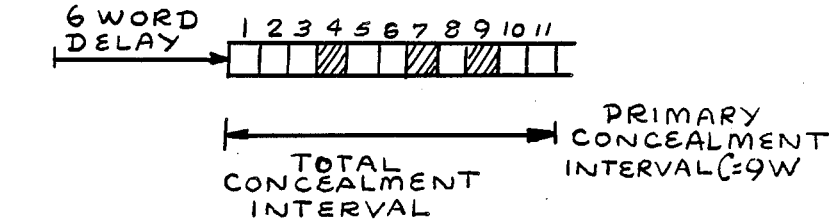

DIGITAL SIGNAL ERROR CONCEALMENT

This application is a continuation-in-part of U.S. application Ser. No. 845,648, filed Mar. 28, 1986 and now abandoned.

BACKGROUND OF THE INVENTION

The present invention relates generally to the selective concealment of errors in a stream of digital signals having some internal correlation. More particularly, the present invention relates to a method and apparatus for concealing such errors through the selection of signals for concealment. The invention is applicable irrespective of the prior correction of errors introduced in the stream of data.

The reliability of transmission of digital signals is determined by the quality of the system by which they are transmitted, which generally includes a transmitter, a transmission channel and a receiver. In practice, the transmission is often not error free. This is because it is often necessary or desirable to transmit data as fast as possible. Errors can be minimized by transmitting data slowly or redundantly, but this limits the transmitting speed. It is also a common practice to correct errors introduced in the digital signals as a result of transmission through a transmission channel, by applying an error correction code to the transmitted digital signals. These codes require the addition of overhead data, and to be of practical use the overhead must be limited. Further, no matter how sophisticated the error correction code, there will exist a set of conditions that will defeat the code and, thereby, leave residual uncorrected errors in the signals recovered after transmission. The probability of such residual errors depends on the code, the transmission channel and the processing strategy employed in the receiver to eliminate errors.

Error detection and correction in digital data communication are well known. See, for example, McNamara, John E., Technical Aspects of Data Communication, Digital Press, 1982, particularly Chapter 13, pp. 110 to 122; Lin, Shu, and Daniel J. Costello, Jr., Error Control Coding, Prentice-Hall, Inc., 1983, particularly Chapters 4, 5 and 6, pp. 85–140 and 170–177; Peterson, W. Wesley, and E. J. Weldon, Jr., Error-Correcting Codes, M.I.T. Press, Seventh Printing 1984, particularly Chapters 8 and 11; Inose, H., and I. Yamamoto, Data Tsushin (Data Communication), Computer Engineering Series, SAMPO, Vol. 3, particularly Section 3.7, pp. 83–107; Berlekamp, Elwyn R., Algebraic Coding Theory, McGraw-Hill, 1968, particularly Chapter 10; Cavell, Peter, "Implementation of Cyclic Redundancy Check Circuits", Electronic Engineering, February 1977, pp. 51–55; Berlekamp, U.S. Pat. No. 4,162,480; and Wood, et al., U.S. Pat. No. 4,527,269. These references describe cyclic redundancy check (CRC) and Reed-Solomon (R-S) codes.

An example of a system using a Reed-Solomon correcting code for detecting and correcting errors in a digital video tape recorder is the system described in Stenerson U.S. Pat. No. 4,597,083.

Irrespective of whether or not there has been some correction of errors, error concealment provides for some improvement in the quality of the stream of recovered data by reducing the effects of the errors without actually recovering exactly the data transmitted. Effective error concealment requires some redundancy in the transmitted data so that other received data can be used to substitute for the erroneous data. Such redundancy is present where there is correlation between the data that have been corrupted and the data to be substituted. Error concealment is particularly effective in overcoming the effects of residual uncorrected errors in digital signals having periodic correlation. In the concealment processing, erroneous signals and signals suspected of error are replaced from other presumed error free signals in the stream of transmitted signals. The degree to which a concealment strategy is effective in masking residual errors depends on the degree of correlation that exists in the signal stream.

Television signals are an example of signals having high periodic correlation. Common television signals for broadcast and most other applications are formed of lines of horizontally distributed picture or video information separated by intervals of horizontal-line-related synchronizing signals defining the beginning of each line. The horizontal lines are further organized into rasters of vertically distributed lines defining fields of lines separated by vertical-field-related synchronizing signals. In turn, the fields are organized into frames, each composed of two interlaced fields of horizontal lines, with lines of each field having a different raster position upon display. The degree of picture correlation between consecutive fields usually is very high, because the picture content from field to field changes very little. The same is true to a lesser degree between frames. There is substantial correlation between corresponding data in successive fields even in noninterlaced (line sequential) television signals. Picture correlation between consecutive horizontal lines of the same frame or field and even between consecutive pixels of the same horizontal line can be high, because adjacent portions of television pictures usually are substantially identical or differ very little.

Although concealment is useful in ameliorating the effects of errors in television and other digital signals having periodic correlation, unlike error correction, it results in information loss. In television signals, this loss of information is evidenced by loss of resolution. Consequently, error correction is favored over concealment, and it is preferred to resort to concealment only when necessary. A concealment strategy should be done to insure no objectionable errors remain.

The frequency and extent of concealment needed for concealing uncorrected errors is affected by the error correction code applied to the digital signals. Error correction codes add some appropriate additional parity information to a block of data information to form a code block. The amount of parity information added relative to the data information contained in the code block determines the ability to detect and correct errors in the data. However, the addition of a large amount of parity information requires a large overhead in the stream of digital signals. To accommodate the large overhead requires a large channel bandwidth and considerable error code processing circuitry.

If the error correction code overhead requirement is to be reduced through use of a simple error correction code, one must accept the possibility that uncorrectable errors will be introduced in the stream of digital signals transmitted through a signal channel. Moreover, if it is desired to keep the overhead relatively low, the probability of residual uncorrectable errors in the transmitted stream of digital signals is relatively high. Should conditions be encountered that result in the occurrence of a large number of residual uncorrected errors within a short interval, uncertainty arises as to whether data not designated to be in error that are located proximate data flagged as containing errors are, in fact, error free, or only apparently so.

This is so because error correction codes at times fail to detect the presence of errors in a transmitted data stream. For example, in a simple parity type error correction code, errors in a transmitted data stream are overlooked on the average of one out of two. That is, there are as many errors not detected as there are errors detected. As a consequence, whenever the rate of detected errors is high, the rate of undetected errors is also high. It may be that when all detected errors can be corrected, the undetected errors can be ignored. However, at least when there is an excessive number of identified residual uncorrected errors, the neighboring data may be considered likely to contain unidentified errors, and concealment may be effected. It has been the practice to conceal individual residual uncorrected errors or all data during an interval when residual uncorrected errors are detected. However, only a few errors may exist during the interval. Therefore, such a concealment strategy would lead to overconcealment or may not conceal unidentified errors.

SUMMARY OF THE INVENTION

In accordance with the present invention, the stream of data, whether or not error corrected, is delayed for an interval to enable detection of uncorrected errors remaining in the data stream. If the number of residual uncorrected errors occurring over a selected interval exceeds a predetermined limit, all data occurring during the selected interval are caused to be concealed, regardless of whether the data are error free or not. However, if the number of such errors be less than the predetermined limit, only the data that are flagged as containing errors are caused to be concealed. By choosing a selected interval of short duration, excessive overconcealment is avoided. On the other hand, the duration should not be so short as to fail to encompass a substantial fraction of undetected errors.

Errors in data words recovered following the transmission of digital data having internal correlation are concealed by substituting recovered correlated words for recovered words suspected of being in error. As used in this context, words are segregated bits of data, such as the 8 bits of an 8-bit byte. Error flag signals are used to identify corresponding respective recovered words that are suspected of being in error. These error flag signals are counted over a predetermined totaling interval and a concealment interval signal is generated over a concealment interval when the count exceeds a predetermined threshold count. Recovered correlated words are substituted for recovered words corresponding to respective error flags and for all other recovered words corresponding to a respective concealment interval. In accordance with one aspect of the invention, the concealment interval is centered upon the corresponding totaling interval.

According to another aspect of the invention, the concealment interval signal is generated upon the occurrence of an error flag signal while the count exceeds the predetermined count. Also, the concealment interval signal is preferably restarted upon the occurrence of a subsequent error flag signal while the count exceeds the predetermined count.

When digital data transmission is performed using an error correcting code, such error concealment may be effected after the words recovered after transmission have been error corrected according to the code. The present invention has particular application to the concealing of errors in words corresponding to picture elements of a raster scan television image where recovered correlated words are words correlated with the recovered words suspected of being in error. Such recovered correlated words may be words derived from a field other than the field of the recovered words suspected of being in error. According to another aspect, the recovered correlated words are corresponding words from the field next preceding the field of the recovered words suspected of being in error.

These and other features and advantages of the present invention will become more apparent upon consideration of the following description of the preferred embodiments and the claims, particularly when taken in connection with the accompanying drawings.

BRIEF SUMMARY OF THE DRAWINGS

FIG. 1 is a simplified schematic block diagram of an embodiment of an error concealment system in accordance with the present invention;

FIG. 2 is a simplified schematic block diagram of a conceal control employed in the error concealment system of FIG. 1;

FIG. 4 is a schematic block circuit diagram of another circuit embodiment of the error concealment system of FIG. 1;

FIG. 5 is a timing diagram illustrating the operation of the embodiment of the error concealment system of FIG. 4 in effecting concealment of uncorrected errors present in a stream of digital signals; and FIGS. 6A to E and 7A to E are timing diagrams illustrating concealments resulting from the execution of concealment strategy by the embodiment of the error concealment system of FIG. 4 for different error patterns.

DETAILED DESCRIPTION

Figure 3:
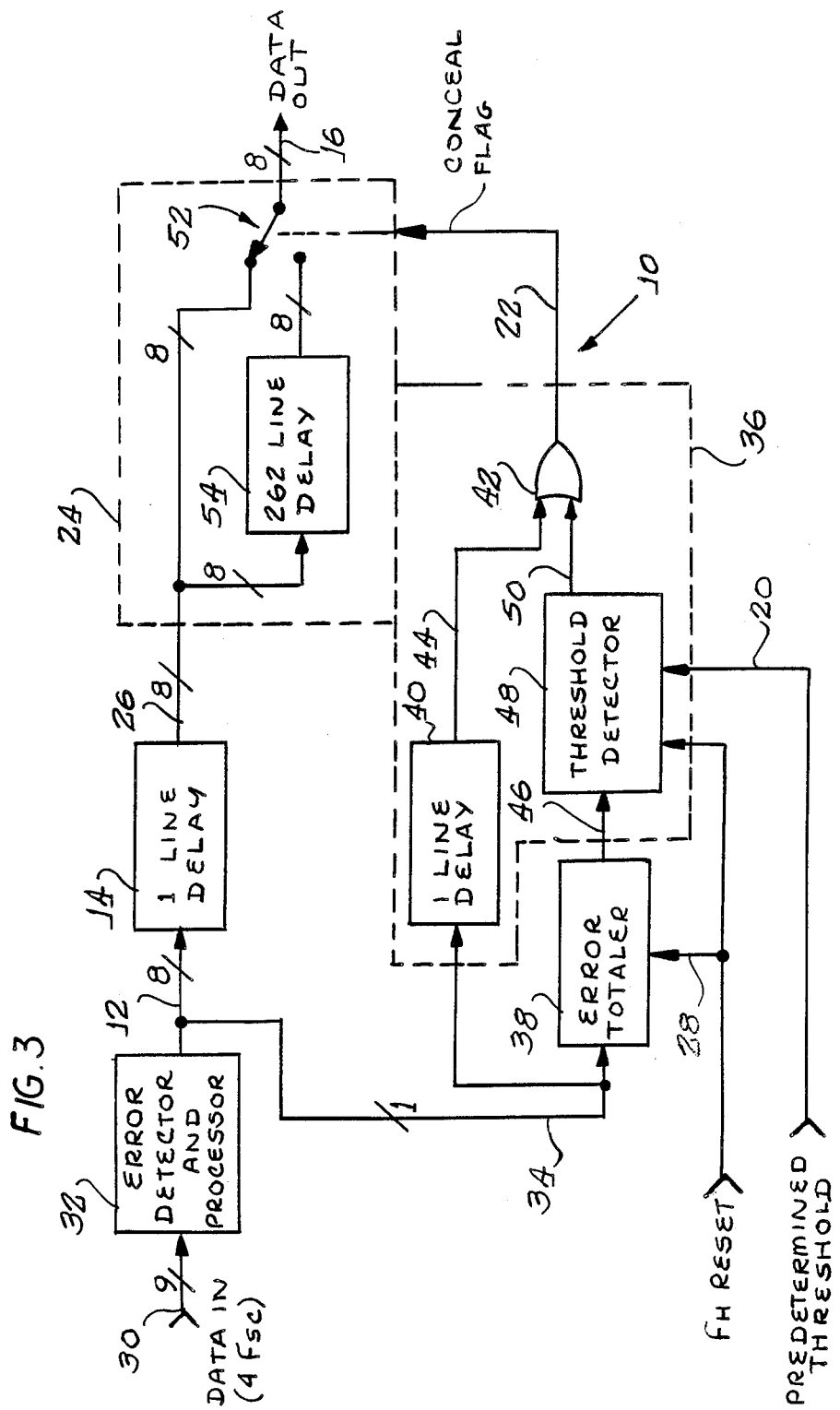
FIG. 3 is a schematic block circuit diagram of one circuit embodiment of the error concealment system of FIG. 1.

In the following description of embodiments of the present invention, like elements will be designated by like reference numerals, and the description of similar elements and circuit portions may not be repeated with reference to subsequent drawing figures related to the various embodiments of the invention.

Broadly stated, the present invention is directed to methods and apparatus for selective concealment of uncorrected errors introduced into a stream of digital signals having periodic correlation and to which may have been applied an error correction code, wherein the selection of signals for concealment is made following any correction of errors introduced in the stream of signals. The invention can take various forms depending upon the nature of the data represented by the stream of digital signals, the nature and degree of periodic correlation and the nature of the applied error correction code. While the methods and apparatus of the present invention offer advantages in concealing uncorrected errors present in various kinds of digital signals, the present invention is particularly suited to the concealment of uncorrected errors introduced into digital television signals, more particularly where the transmission medium is the magnetic tape of a digital video tape recorder. Embodiments of the present invention are illustrated and described herein as arranged to conceal uncorrected errors remaining in digital television signals after they have been subjected to error correction processes. Furthermore, the various embodiments illustrated and described herein are adapted to effect such concealment in television signals formatted according to the NTSC 525 line two-field interlaced television signal standard, although the present invention is equally suited to conceal uncorrected errors present in television signals formatted according to other standards.

FIG. 1 is a simplified block diagram of a preferred embodiment of an error concealment system 10 arranged in accordance with the present invention. Generally, the system 10 measures, over a look-forward period, the total number of uncorrected data word errors remaining in the recovered and error corrected data words appearing on an input line 12 and takes appropriate concealment action. A delay 14 is provided in the data word path extending from the input line 12 to an output line 16, which couples the data words to a signal utilization device after any correction and concealing. This delay is selected according to the processing time required to measure the uncorrected errors contained in the input data words and to generate the required control signals for effecting any desired concealment of remaining errors. The total number of uncorrected data word errors remaining in the input data is measured by a conceal control 18. When the error total over the totaling period exceeds a predetermined limit set by a predetermined threshold signal on a line 20, a conceal flag signal is issued for a concealment interval on a line 22 extending to an error concealer 24.

The data input of the error concealer 24 is coupled by a line 26 from the delay 14, and is responsive to such conceal flag signal to conceal all the data words occurring within the period of the conceal flag. If the total number of errors is less than the predetermined limit, the conceal flag is created only for the identified erroneous words, and only the data words that be specifically indicated as in error are concealed as a result of the conceal flag signal on the line 22. A reset signal placed on a control line 28 determines the totaling period over which error totaling is performed.

More specifically, in a preferred embodiment, in the recovery of the digital television signals or data words received from a transmission channel and appearing as data on an input line 30, data words are processed by an error detector and processor 32 to detect and correct errors contained therein. Following this correction, the error corrected digital television data words are coupled by the line 12 to the delay 14. The error detector and processor 32 operates in a well known manner according to the particular error detection and/or correction code used, which may, for example, be a well known Reed-Solomon (R-S) code or a cyclic redundancy check (CRC) code. The design and operation of a system utilizing a Reed-Solomon code for error detection and correction are described in Stenerson U.S. Pat. No. 4,597,083. Whatever code is used, there are two outputs of the processor 32. The corrected data, including any residual uncorrected data are output on the line 12. Error flags attached to or corresponding to uncorrected data words on the line 12 are output on a line 34. Such error flags may be provided substantially as described by Stenerson. It may be noted, however, that Stenerson provides for interleaving, which divides his purported codewords into smaller words, all of which may be flagged if error be uncorrected in respective purported codewords. The interleaving has the effect of dispersing the flagged words so as not to overload a particular area of the resulting video picture with errors. The error flags may thus indicate suspected errors in words that are actually correct. However error flags are created, they can only indicate that error is suspected, for the error flags themselves may be the result of error of transmission and recovery. It may be that parity data are not correctly recovered.

In certain circumstances, it may not be necessary or desirable or practical to perform error correction. In such circumstances, the error detector and processor 32 simply identifies erroneous data words and outputs corresponding error flags on the line 34 while passing all incoming data words out on the line 12. In any event, the error flags are applied over the line 34 to the conceal control 18.

A preferred embodiment of the conceal control 18 is illustrated in FIG. 2. The detected word errors flagged by the word error flag signal on the line 34 are applied to a conceal select control 36. This error flag signal is also applied to a word error totaler 38, where the word error count is totaled over a selected totaling period determined by the reset signal on the control line 28. The reset signal synchronizes both the word error totaler 38 and the conceal select controller 36. The total error count is input to the conceal select controller 36 at the end of the totaling period. The total error count is compared with the predetermined threshold, and depending upon this comparison, the conceal select controller 38 determines whether individual words or all data words over a selected period are to be concealed.

If individual data words are to be concealed, the conceal select controller 36 passes the error flag signal directly to its output 22 as the conceal flag signal. If it is necessary to conceal all the data words during the selected period, the conceal flag signal is set to effect concealment of every word of the data stream occurring during this period, instead of only the data words in error as flagged by the error detection and processor 32.

The conceal flag signals are timed relative to the data words from the delay 14 so that the conceal flags arrive at the error concealer 24 synchronously with respective data word to be concealed. This is necessary because the conceal select controller 36 is not able to determine whether individual data words are to be concealed or all data words occurring during the concealment period are to be concealed until the expiration of the totaling period, when the total error information is available for the concealment decision to be made.

FIG. 3 illustrates a preferred embodiment of the error concealment system 10 arranged so that the look forward period, defined by the delay 14, corresponds to the error totaling period, and also to the concealment interval over which concealment occurs when the total errors occurring during the totaling period exceeds the predetermined threshold. In the embodiment of FIG. 3, each of these periods equals a duration corresponding to one horizontal line interval of the received digital television signal. Moreover, the circuits of this embodiment are arranged to process digital data in the form of 8-bit data words transmitted through the system 10 as 8-bit parallel bytes.

More particularly, the input data words are coupled by the line 12 to a one horizontal line delay 14. The error flags accompanying the data words from the error detector and processor 32 are coupled by the line 34 to the input of a second one horizontal line delay 40 contained in the conceal select control 36. This second delay 40 times the coupling of the conceal flag signal to the error concealer 24 so that it arrives there synchronously with the corresponding data word from which the conceal flag has been generated. The generation and coupling of the conceal flag are effected by an OR gate 42, having an input line 44 coupled to the output of the second delay 40 and providing its output on the line 22.

Error flag signals present on line 34 also are coupled to the input of the error totaler 38. The error totaler 38 counts the number of error flag signals placed on the line 34 during the totaling period determined by the reset signal placed on the line 28. A signal indicative of the contents of the error totaler 38 during the totaling period is present on the output line 46 of the error totaler, which extends to the input of a threshold detector 48 contained in the conceal select control 36. During each totaling period, the threshold detector 48 compares the number of error flag signals counted by the error totaler 38 to the predetermined threshold present on the line 20. If the comparison indicates the error totaler 38 has counted at least a number of error flag signals corresponding to the predetermined threshold, the threshold detector 48 generates a concealment interval signal and applies it over a line 50 extending to an input of the OR gate 42. This signal is of a duration corresponding to the interval of the totaling period (one horizontal line interval in the embodiment of FIG. 3). When such signal is issued by the threshold detector 48, the OR gate 42 responsively generates a conceal flag signal on the line 2, which causes the error concealer 24 to replace the respective entire horizontal line of television signal data containing the excessive number of errors.

In the embodiment of the error concealment system 10 illustrated in FIG. 3, the error concealer 24 includes a selector switch 52 that operates in response to the conceal flag to select between one of two signal paths extending between the output of the delay 14 and the selector switch 52. In the position shown in FIG. 3, the selector switch 52 couples the output of the delay 14 directly to the output line 16 of the system 10. The second path extending between the delay 14 and the switch 52 includes a delay 54 that delays the signal placed on the line 26 by an interval corresponding to 262 horizontal lines. For a data rate of 4Fsc (4 times the frequency of color subcarrier signal of the NTSC television signal), for which the embodiment of FIG. 3 is arranged, samples of the television signal represented by erroneous, uncorrected data words can be replaced directly, and without further processing, by data words representative of data samples at raster locations spatially displaced 262 horizontal lines.

As previously described, the degree of correlation between horizontal lines from consecutive television fields at adjacent raster positions is ordinarily quite high. Therefore, the selector switch 52 is responsive to conceal flag signals placed on the line 22 to couple the output line 16 to the output of the 262 line delay 54. When the error rate in the data present at the input line 12 does not exceed the level determined by the predetermined threshold signal present on the line 20, the conceal flag signals generated by the OR gate 42 from inputs from the delay line 40 cause the selector switch 52 to be operated to replace only each data word that is in error and is currently on the line 26, with a respective data word from the 262 line delay 54, the latter having occurred previously in the data stream. If the data error rate exceeds the threshold level determined by the predetermined threshold signal, the conceal flag signal generated by the OR gate 42 from input received from the threshold detector 50 is coupled to the selector switch 52 to cause it to couple replacement data words to the output line 16 for the entire duration of the concealment period, one line in the illustrated embodiment.

Because the totaling period and the concealment period of the embodiment of FIG. 3 are one horizontal line interval, the error totaler 38 and the threshold detector 48 can conveniently be reset by a control signal derived from the horizontal line synchronizing signal included in television signals. This horizontal line rate signal is coupled by the line 28 to the error totaler 38 and to the threshold detector 48. In one embodiment constructed in accordance with FIG. 3, a predetermined threshold signal corresponding to 64 data word errors per horizontal interval (composed of approximately 900 data word intervals) of the television signal is used as the measure determining when the input data error rate is excessive. It should be appreciated, however, that the threshold level can be set for any input data error rate, and can be programmed to change, if desired, for different intervals of the input data having different error characteristics.

Referring now to FIGS. 4, 5, 6 and 7, an error concealment system 10 is illustrated wherein the error totaling period P is moved in time, input data word by input data word, while remaining centered relative to the primary concealment interval wherein data are concealed when the uncorrected data error rate exceeds that determined by the predetermined threshold signal placed on the line 20. The primary concealment interval C may be equal to the moving error totaling period, or to some other interval. In the illustrated embodiment, the totaling period P is equal to 5W, and the primary concealment period C is equal to 9W, where W is one data word interval. Referring to FIG. 5, the timing is shown for time t and t+1, where the time between t and t+1 is equal to W. Also shown are the moving totaling periods of P1 and P2 for the two times of t and t+1, where 1 is the time slot for a single word W.

In the embodiment illustrated in FIG. 4, in order for concealment to be effected over a 9 word (9W) primary concealment interval C centered on a 5 word (5W) totaling period P, a six data word delay 60 is required in the signal path between the input line 12 and the error concealer 24. This requires a corresponding six data word delay 62 for coupling error flag signals present from the output of the error detector and processor 32 to the input of the OR gate 42 of the conceal select control 36 for forming the conceal flag signal. The error flag signals generated by the word error checker 32 are also coupled to the input of a 4-bit shift register 64 by the line 34. This shift register accumulates the error flag signals associated with four consecutive data words for presentation to an error bit totaler 66, and is updated every data word to present at its 4-bit output line 68 the error flag signals associated with the four preceding data words received on the line 12. The current error flag signal is applied to the error bit totaler 66 directly from the line 34. The error bit totaler thus is effectively reset each word to provide a count of total error flags over the current word and the previous four words.

The error bit totaler output is coupled by a line 70 to a threshold detector 72, which also receives at its other input the predetermined threshold signal over the line 20. In this embodiment, the threshold limit is set to be satisfied by a count of 2. Therefore, whenever the output of the error bit totaler 66 indicates a count greater than 1, at least 2 out of 5 consecutive data words are suspected of being in error, and the threshold detector 72 responds by issuing an excessive error signal over a line 74 extending to one input of an AND gate 76. The current error flag signal is also applied to the other input of the AND gate 76, whereupon the AND gate 76 produces a conceal initiation signal on an output line 78 whenever a current error occurs during a totaling interval containing an excessive number of errors. The conceal initiation signal is applied to an 8-bit shift register 80. The 8 outputs of the 8-bit shift register are applied in parallel over a line 81 to a 9 input OR gate 82 to which the conceal initiation signal on the line 78 is also applied. The OR gate 82 thus provides a conceal interval signal whenever there has been a conceal initiation signal over the last 9 words, that is, whenever there has been in the last 9 words an error flag occurring during a totaling interval (5 words) containing an excessive number of errors (at least 2 in the example). Stated still another way, a primary 9W concealment interval will be created whenever a conceal initiation signal appears on the line 78, and the concealment intervals are extended whenever another conceal initiation signal occurs during a concealment interval. The output of the OR gate 82 is applied over a line 84 to one input of the OR gate 42. As described hereinbefore, the OR gate 42 couples the conceal flag onto the line 22 extending to the control input of the selector switch 52.

The result is that in addition to concealing individual errors by reason of the delayed error flag signal from the 6 word delay 62, concealment will be effected for suspected errors in the 9 word concealment interval comprising the 6 words prior to and the 2 words after any corresponding error flag occurring during a 5 word totaling interval containing at least the threshold number of errors, 2 in this example. Where additional errors occur during an interval of excessive errors, the actual concealment interval is extended until 2 words after the last additional error. The operation of the system illustrated in FIG. 5 is illustrated in FIGS. 6A to E and 7A to E, wherein the effects of different error patterns are illustrated.

In FIG. 6A is illustrated an example of an error pattern in a data stream wherein data words 3 and 7 are determined to be in error, as indicated by corresponding error flags on the line 34. The error bit totaler 66 totals errors over a 5-bit totaling interval and applies the total to the threshold detector 72, which outputs a signal as shown in FIG. 6B when the totaling interval P3 is reached, this being the interval including words 3 to 7 and the first 5 word interval containing 2 errors. FIG. 6B illustrates the excessive error signal appearing on the line 74. At the same time, this signal and the error flag signal corresponding to word 7 are applied to the AND gate 76 to produce the conceal initiation signal on the line 78, as shown in FIG. 6C. The 8-bit shift register 80 and the OR gate 82 then provide a conceal interval signal as shown in FIG. 6D. Because of the 6 word delay occasioned by the 6 word delay circuit 60, the conceal interval signal, and the consequent conceal flag signal to the error concealer 24, effects concealment beginning with word 1 and extending to word 9, as shown in FIG. 6E, centered on word 5, the center of the corresponding totaling interval P3.

In FIG. 7A is illustrated an error pattern in a data stream wherein data words 4, 7 and 9 are indicated to be in error by corresponding error flags on the line 34. As shown in FIG. 7B, when the totaling interval P3 is reached, an excessive error signal appears on the line 74. This signal remains through the totaling interval P7, which includes words 7 to 11, for in each of totaling intervals P3 to P7 there are at least two errors. Error flags corresponding to words 7 and 9 are coincident with the excessive error signal on the line 4, resulting in conceal initiation signals at these times on the line 78, as shown in FIG. 7C. The first conceal initiation signal, at word 7, starts a 9 word primary concealment interval. The second conceal initiation signal, at word 9, restarts a 9 word primary concealment interval. Because the second primary concealment interval begins before the first is complete, it simply extends the actual concealment interval to end with word 11, that is, 2 words after the concealment of word 9. This is shown in FIG. 7D, which shows the conceal interval signal on the line 84, and in FIG. 7E, which shows the data concealed.

This results in the concealment of data words with appended error flag signals and data words without appended error flag signals. This assures that apparently error free, but possibly erroneous, data words are concealed whenever the input data error rate becomes excessive.

It should be understood that although various embodiments of the present invention have been illustrated and described in the foregoing, various modifications thereof will become apparent to those skilled in the art. For example, other data may be substituted, as by taking the average or weighted average of good data stored in a frame store. Data can be substituted from earlier or later frames or from lines after as well as before the suspect data, using appropriate delays. Motion detectors can be used to give preference to stored data where there has been no motion detected. The totaling interval and the concealment interval may be selected empirically for particular error correcting codes and transmission systems, conditions and circumstances.

It should also be understood that various implementations of various components may be by known components and that conventional means may be used to provide power and to provide control and timing pulses for synchronizing and timing purposes. The delay circuits may be properly timed shift registers, appropriately addressed memory stores, or other known means.

What is claimed is:

1. A method for concealing errors in data words recovered following the transmission of digital data having internal correlation wherein recovered correlated words are substituted for recovered words suspected of being in error, said method comprising providing error flag signals identifying corresponding respective recovered words suspected of being in error after any error correction has been effected, counting said error flag signals over a predetermined totaling interval and generating a concealment interval signal over a concealment interval when the count exceeds a predetermined count, and substituting recovered correlated words for recovered words corresponding to respective error flags and for all other recovered words corresponding to a respective said concealment interval.

2. A method according to claim 1 wherein said concealment interval is centered upon the corresponding totaling interval.

3. A method according to claim 1 wherein said digital data transmission is performed using an error correcting code, data words recovered after transmission are error corrected according to said code, and said method for concealing is performed in respect to said recovered words after said correction, said error flag signals identifying corresponding respective recovered words suspected of residual uncorrected error.

4. A method according to claim 3 wherein said concealment interval is centered upon the corresponding totaling interval.

5. A method according to claim 1 wherein said concealment interval signal is generated upon the coincidence of an error flag signal and a said count exceeding said predetermined count.

6. A method according to claim 5 wherein said concealment interval is centered upon the corresponding totaling interval.

7. A method according to claim 5 wherein said concealment interval signal is restarted upon the coincidence of a subsequent error flag signal and a said count exceeding said predetermined count.

8. A method according to claim 7 wherein said concealment interval is centered upon the corresponding totaling interval.

9. A method according to claim 1 wherein said concealment interval signal is generated upon the coincidence of an error flag signal and a said count exceeding said predetermined count.

10. A method according to claim 9 wherein said concealment interval is centered upon the corresponding totaling interval.

11. A method according to claim 9 wherein said concealment interval signal is restarted upon the coincidence of a subsequent error flag signal and a said count exceeding said predetermined count.

12. A method according to claim 11 wherein said concealment interval is centered upon the corresponding totaling interval.

13. A method according to any one of claims 1 to 12 wherein said words correspond to picture elements of a raster scan television image and said recovered correlated words are words correlated with said recovered words suspected of being in error.

14. A method according to claim 13 wherein said recovered correlated words are words derived from a field other than the field of said recovered words suspected of being in error.

15. A method according to claim 14 wherein said recovered correlated words are corresponding words from the field next preceding the field of said recovered words suspected of being in error.

16. A system for concealing errors in data words recovered following the transmission of digital data having internal correlation wherein recovered correlated words are substituted for recovered words suspected of being in error, said system comprising means for identifying recovered words suspected of being in error after any error correction has been effected by providing corresponding respective error flag signals, means responsive to said error flag signals for counting said error flag signals over a predetermined totaling interval and generating a concealment interval signal over a concealment interval when the count exceeds a predetermined count, and means responsive to said error flag signals and said concealment interval signal for substituting recovered correlated words for recovered words corresponding to respective error flags and for all other recovered words corresponding to a respective said concealment interval.

17. A system according to claim 16 wherein said digital data transmission is performed using an error correcting code, data words recovered after transmission are error corrected according to said code, and said system for concealing is operative in respect to said recovered words after said correction, said means for identifying recovered words suspected of error being indicative of such words only as are suspected of remaining uncorrected after such correction.

18. A system according to claim 16 wherein said means for counting and generating generates said concealment interval signal upon the coincidence of an error flag signal and a said count exceeding said predetermined count.

19. A system according to claim 18 wherein said means for counting and generating restarts the concealment interval signal upon the coincidence of a subsequent error flag signal and a said count exceeding said predetermined count.

20. A system according to any one of claims 16 to 19 wherein said concealment interval is centered upon the corresponding totaling interval.

* * * * *